United States Patent [19]
Kato et al.

[11] Patent Number: 6,009,245
[45] Date of Patent: Dec. 28, 1999

[54] SERIAL PRINTER, AND IMAGE BUFFER ACCESS METHOD FOR SERIAL PRINTER

[75] Inventors: Takashi Kato; Yasuhiro Ohshima, both of Nagano, Japan

[73] Assignee: Seiko Epson Corporation, Tokyo, Japan

[21] Appl. No.: 09/041,749

[22] Filed: Mar. 13, 1998

[30] Foreign Application Priority Data

Mar. 13, 1997 [JP] Japan ................................ 9-058729
Aug. 11, 1997 [JP] Japan ................................ 9-216630

[51] Int. Cl.⁶ .................................................. G06K 15/00
[52] U.S. Cl. ........................................ 395/116; 395/108
[58] Field of Search ................................... 395/101, 104, 395/105, 108, 111, 115, 116; 347/142, 144, 145, 180, 181, 182, 195, 196, 211, 237, 249; 345/507, 509, 515, 196, 516, 517, 203

[56] References Cited

U.S. PATENT DOCUMENTS 4,567,570  1/1986  Peer ........................................ 395/108
5,793,939  8/1998  Sagayama ................................ 395/115

*Primary Examiner*—Arthur G. Evans
*Attorney, Agent, or Firm*—Sughrue, Mion, Zinn Macpeak & Seas, PLLC

[57] ABSTRACT

Data for C, M, Y and K color nozzle arrays are stored in the same memory area in an image buffer 31'. The data groups, which are to be respectively transmitted to the C, M, Y and K color nozzle arrays at a specific print timing, are stored at continuous addresses in the image buffer 31', as is shown by the shaded portion. In a transfer process, a plurality of bytes for the C, M, Y and K color nozzle arrays, which are at continuous addresses 1 to 20, are read as a data set from the image buffer 31', and at the same time are transmitted to the print head.

17 Claims, 11 Drawing Sheets

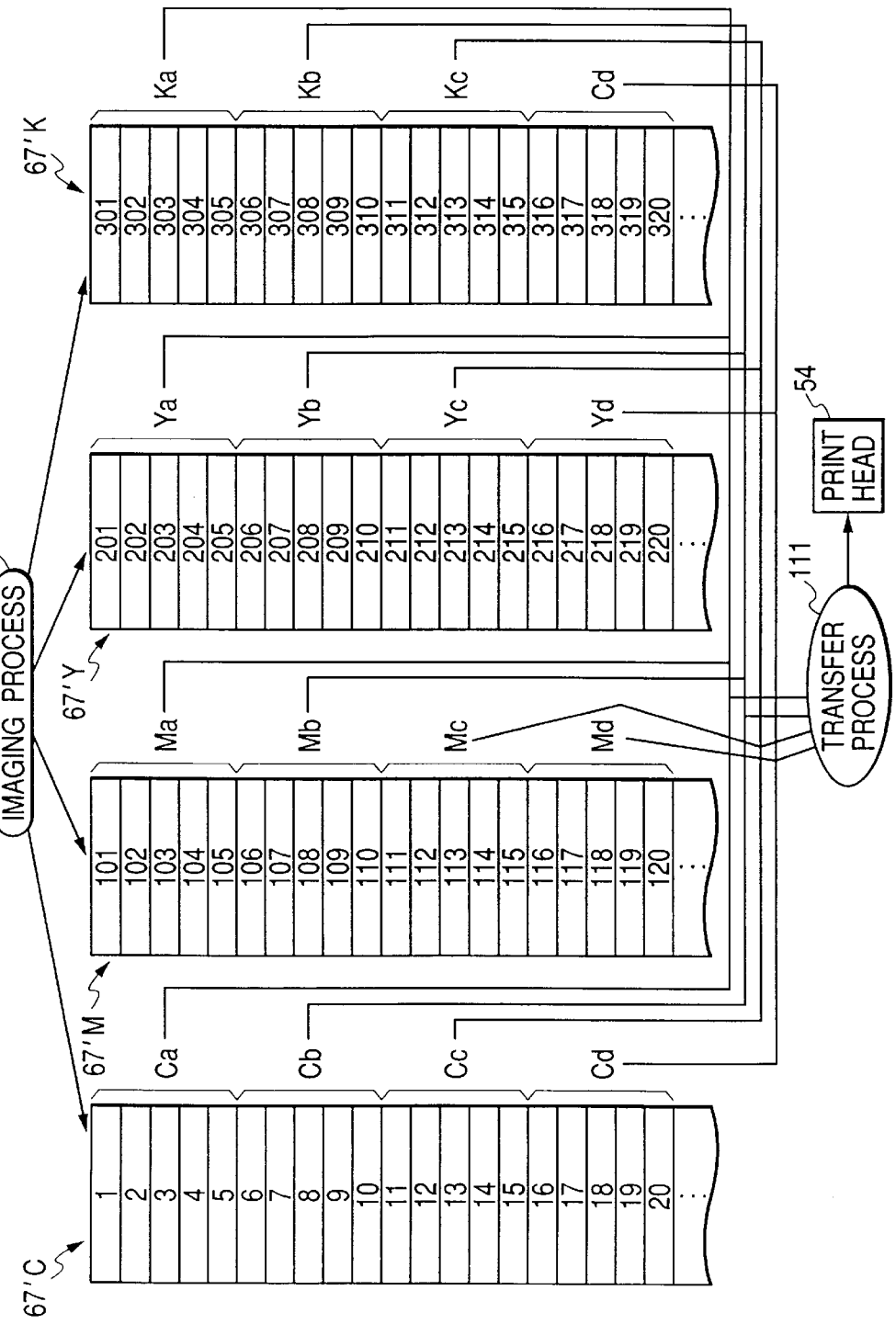

SERIAL PRINTER, AND IMAGE BUFFER ACCESS METHOD FOR SERIAL PRINTER

BACKGROUND OF THE INVENTION

1. Field of the Invention

The present invention relates to a serial printer that is employed in a computer system as a terminal printer or a facsimile terminal, and in particular to a serial printer that employs an improved method for storing data in an image buffer.

2. Related Art

A conventional serial printer generates an interrupt for each printing sequence, and in accordance with an interrupt process program, transmits required image data from a buffer (an image buffer), in which they are stored, to a print head. Provided in the print head are a plurality of dot formation elements (e.g., ink-jet nozzles or impact wires) that are arranged in the columnar direction (perpendicularly), and as the head is moved across a row (horizontally), the dot formation element array is activated each time it reaches the position of an individual pixel.

Therefore, for the transfer of image data to the print head, a set of data for each dot formation element array is transferred to the print head.

FIG. 10 is a diagram showing how to handle data stored in the image buffer of the serial printer.

Source data for input to a serial printer are first stored to a memory area called a data buffer 61. The source data can include various types of image data; thus, in the example shown in FIG. 10, for easy understanding of what is defined as last image data 69 that is held in an image buffer 67, which will be described later, raster graphics image data 65, which correspond to the last image data 69, are stored that are supposed to be included in the source data. The individual blocks denoted by numerals 1, 2 and 3 in the source image data 65 represent the data for one byte (a set of eight sequential pixels on the same line). The numbers provided for the bytes indicate the order in which an image has been scanned using the raster method.

That is, rater scanning begins at the topmost line (horizontal line) in an image, and scans the pixels in this line horizontally from the left to the right (or in the reverse direction) (byte 1 to byte 10 in FIG. 10), and then scans the second line horizontally (byte 11 to byte 20) and moves to the line immediately below. This process is repeated until the scanning is completed for the bottom line.

In an imaging process 63, the source data 65 read from the data buffer 61 are employed to generate the last raster graphics image data 69, which are written in the image buffer 67. In the imaging process 63, the order in which the last image data 69 is generated corresponds to the above described raster scanning order (i.e., the order following the byte numbers in FIG. 10), while the order in which the image buffer 67 is accessed when the data is written corresponds simply to the address order. Therefore, the last image data 69 are so stored in the image buffer 67 that, as is shown in FIG. 10, when data in the image buffer 67 are accessed in the order of the addresses, the bytes are read in the raster order (in the ascending number order).

Then, in a transfer process 111, the bytes of the last image data 69 are read from the image buffer 67 and are transmitted to the print head. The order in which the bytes are read from the image buffer 67 corresponds to the order in which the dot formation elements are arranged in the sub-scanning direction of the print head, which does not match the raster scanning order. Specifically, the general print head for a serial printer has a plurality of dot formation elements (e.g., ink-jet nozzles or impact wires) that are arranged in the sub-scanning direction (the columnar direction), and while the head is moving in the main scanning direction (along a row), the dot formation element array must be activated each time it reaches the location of an individual pixel. For the transfer process 11, therefore, a set of a plurality of bytes that are to be given to the dot formation element array, i.e., a plurality of bytes that are arranged in the image buffer 67 in the columnar direction, must be read.

Assuming that there are four dot formation elements in one array, in FIG. 10, first, a set of four bytes, bytes 1, 11, 21 and 31, is read, then a set of bytes 2, 12, 22 and 32, is read, and finally a set of bytes 3, 13, 23 and 33 is read. However, the bytes that are to be read as a set are stored at addresses that are located separate from another in the image buffer 67.

A conventional method, employed by a serial color ink-jet printer, for storing data in an image buffer and for transferring data to a print head will now be described.

First, as an assumption, a color adjustment problem of the conventional serial printer will be described while referring to FIG. 11.

In FIG. 11(a) is shown the schematic arrangement for a print head, in a serial in-jet color printer, though which ink is ejected. For this explanation, it is presumed that in a print head 54 there are four nozzle arrays 71, 72, 73 and 74. A plurality of nozzles 71a, 72a, 73a and 74a are provided for each of the nozzle arrays 71, 72, 73 and 74. Further, the arrangement for the nozzle arrays 71, 72, 73 and 74 is so designed that the arrays are separated by a predetermined distance d.

When, for example, color printing is to be performed using the print head 54 in FIG. 11(a), differently colored inks, such as cyan (C), magenta (M), yellow (Y) and black (K), are allocated for the nozzle arrays 71, 72, 73 and 74, and C, M, Y and K dots are printed at the same location for mixing the colors.

Specifically, as is shown in FIG. 11(b), when the print head 54 is located at position (A), the ink is ejected through the nozzle array 71, and when the print head 54 is located at position (B), the ink is ejected through the nozzle array 72. Similarly, when the print head 54 is located at position (C), the ink is ejected through the nozzle array 73, and when the print head 54 is located at position (D), the ink is ejected through the nozzle array 74. As a result, differently colored inks are ejected through the nozzle arrays 71, 72, 73 and 74 at a print location 76 on a printing sheet 55, and the four colors of C, M, Y and K are blended in order to provide color printing.

As is described above, the print head of the color ink-jet printer is so designed that, for example, ink-jet nozzle arrays for four colors, cyan (C), magenta (M), yellow (Y) and black (K), each array including a plurality of nozzles (five nozzles in FIG. 11), are located at a predetermined interval d. During the transfer of data performed by the above program, data are transmitted for each nozzle array.

In FIG. 12 is shown a method, employed by a conventional serial color printer, for storing data in an image buffer.

In the imaging process 63 (see FIG. 10) performed by the conventional serial color printer, C, M, Y and K images are individually developed in the memory, as is shown in FIG. 12(a).

As is shown in FIG. 12, an image buffer 67' how separate for memory areas for the individual C, M, Y and K color nozzle arrays.

And as is shown in FIG. 12(b), data are stored for each of the C, M, Y and K nozzle arrays, with sets of data in the memory being provided for each nozzle array in a count equivalent to the number of nozzles. Thus, as is shown in FIG. 12(a), the above described data for eight horizontal bits (one byte) are stored discontinuously for each C, M, Y or K nozzle array.

Specifically, assume that data (one byte) corresponding to a set (8 bits) of pixel values (1 bit each), each of which indicates whether a dot is printed or not at the same printing location 76 on the printing sheet 55 shown in FIG. 11(b), is represented as a shaded portion, as is shown in FIG. 12(a). The shaded portions for C, M, Y and K colors are stored to be discontinuously located. The portions consisting of one byte, two bytes and three bytes, respectively denoted by d', 2d' and 3d' in FIG. 12(a), are dummy memory values of the image buffer 67'. That is, by the dummy image portions, the data are seemed to be present. When the process is performed in the direction indicated by an arrow in FIG. 12(a), the transfer of data to the print head is begun, and the transfer timings for the data are so shifted that the above described color printing can be provided.

In FIG. 12(a), portion d' corresponds to the memory value that corresponds to the predetermined distance d separating the nozzle arrays shown in FIG. 11, and the actual image (printing) area in the memory is as is shown in FIG. 12(a). In the transfer process 111, data are extracted, in order, from the C, M, Y and K memory areas in the image buffer 67' as is shown in FIG. 12(b), and are transmitted to the print head. In other words, a plurality of bytes, which are arranged in the direction of rows in the memory area for each color that corresponds to one nozzle array, are read as a set from the image buffer 67' and are transmitted to the print head. The data for one column are transmitted to the print head in consonance with at a specific print timing.

A method employed by the conventional serial color printer for accessing the image buffer 67' will now be described while referring to FIG. 13.

As is apparent from the above explanation, in the imaging process 63 the C, M, Y and K color images are developed individually, and C, M, Y and K color image data respectively are stored, in that order, in memory areas 67'C, 67'M, 67'Y and 67'K in the image buffer 67', as is shown in FIG. 13. In the transfer process 111, in consonance with a specific timing, data for five bytes, Ca, Ma, Ya and Ka, are transmitted to the print head from the C, M, Y and K color memory areas 67'C, 67'M, 67'Y and 67'K, as is shown in FIG. 13.

In consonance with the following print timing, data for five bytes, Cb, Mb, Yb and Kb, are transmitted to the print head, and at the third print timing, data for five bytes, Cc, Mc, Yc and Kc, are transmitted to the print head.

As is apparent from FIGS. 12(b) and 13, the location from which the data are extracted differs for each color because, as is described above, the C, M, Y and K ink-jet nozzle arrays of the print head are separated by the predetermined distance d (see FIG. 11).

In another conventional serial color printer, independent pointers and counters are required for the four colors, C, M, Y and K, while a program is used for managing the pointers for individual colors.

Recently, since the amount of image data has increased in consonance with an increase in printing densities, reducing the transfer periods, which have accordingly been extended, has become important.

In the conventional art explained while referring to FIG. 10, in the transfer process 11 a set of a plurality of bytes, which are arranged in the direction of rows and which correspond to the dot formation element array, is read from the image buffer 67. The bytes arranged in the direction of rows are stored in memory areas at addresses that are separated from each other in the image buffer 67. In the transfer process 111, therefore, calculation of the separated addresses must be performed for each data reading.

In the transfer process 111, the time at which a set of the bytes is transferred from the image buffer 67 to the print head must be determined in consonance with the time at which the dot formation element arrays arrive at individual pixel positions. Actually, the transfer process is performed as an interrupt process for which a periodical signal that is generated by a carriage moving system is used as a trigger. While the transfer process must be performed at a timing that is vigorously controlled, the performance of the above described complicated address calculation increases the load imposed on the CPU, and deteriorates throughput.

With the conventional method used for storing data in the image buffer and that has been explained for the color serial printer, the image buffer is separated into memory areas for four colors, C, M, Y and K, as is shown in FIGS. 12 and 13, and image data for four colors are discontinuously stored for individual C, M, Y and K nozzle arrays.

As is shown in FIGS. 12(b) and 13, therefore, when the data is to be transferred to the print head in the transfer process 111, the discontinuous addresses must be accessed a number of times that corresponds to the number of colors. In addition, in another conventional serial printer, the pointers for the colors C, M, Y and K must be managed independently. When the data are to be transmitted to the program, therefore, much labor is required for the management of the pointers for the extraction of data.

DMA may be employed for high-speed data transfer. However, the number of nozzle arrays in the serial printer is three, or may be as many as ten, and when, for example, the data are stored discontinuously for the C, M, Y and K nozzle arrays, at least four DMA transfer circuits (channels) are required to transfer data to the print head.

In this case, however, since only two DMA transfer circuits (channels) are incorporated in a comparatively inexpensive CPU, the DMA method is actually not fully employed for transferring data to the print head.

SUMMARY OF THE INVENTION

It is, therefore, a first object of the present invention to provide a serial printer that obtains continuous image data that are set, at the same printing timing, for dot formation element arrays in a print head; reduces the number of times address calculations and memory accesses times are required by transferring sets of image data; reduces the load imposed on the CPU during the data transfer; and improves the throughput.

It is a second object of the present invention to provide a serial printer that reduces the address calculations required for a process by which image data are transferred from an image buffer to a print head, so that the time required for a process for which a restriction concerning time is reduced and the throughput is improved.

To achieve the above objects, a serial printer according to the present invention stores, at continuous addresses in an image buffer, pixel values or pixel value groups of image data that are set, at the same printing timing, for a predetermined dot formation element array for a print head.

Specifically, according to the invention, provided is a serial printer, which includes a print head consisting of at least one dot formation element array, which performs an imaging process for generating image data which storing the image data in an image buffer and a transfer process by which the image data are transferred from the image buffer and are set in the predetermined formation element array, and which displaces the print head in a main direction and initiates printing in accordance with a predetermined printing timing, wherein a pixel value or pixel value groups for image data, which are set at the same printing time for the predetermined dot formation element array, are stored at continuous addresses in the image buffer.

Since pixel values or pixel value groups of image data, which are set at the same printing timing for a specific dot formation element array, are stored at continuous addresses in the image buffer, a set of data can be transferred for the dot formation element array at a specific printing timing, and continuity can be provided for data during the transfer.

According to the invention, in the imaging process, pixel values or pixel value groups of image data, which are set for the predetermined dot formation element array at the same printing timing, are stored at continuous addresses in the image buffer.

Therefore, in the transfer process, pixel values or pixel value groups can simply be read from the image buffer in the address order, and can be transmitted to the print head. That is, complicated address calculations are not required for the transfer process, and the time required for the transfer process is reduced. Instead, address calculations are required in the imaging process; but since no restriction concerning time is imposed on the imaging process, unlike the transfer process, the total load imposed on the CPU is reduced. The imaging process is originally a dispersed process, and for this process, continuous addresses are not as much required as for the transfer process. During the transfer process, only the data transfer between memories is performed, which is adequate for data transfers performed for the block units.

For a serial printer according to the present invention, in the imaging process, pixel values or pixel value groups for image data are generated in a raster scanning order, and are stored at addresses in the image buffer that are separated by a distance corresponding to the number of dot formation elements in the sub-scanning direction.

Such a storage method is one whereby, in the imaging process, pixel values or pixel value groups for image data are generated in a raster scanning order; whereby the pixel values or the pixel value groups for one line that are sequentially generated are stored at addresses in the image buffer that are separated by a distance corresponding to the number of dot formation elements that are arranged in a print head in the columnar direction; and whereby pixel values or pixel value groups that are sequentially generated for a subsequent line are stored at addresses following the addresses for the pixels and the pixel value group for a previous line. In other words, according to this method, the pixel values or the pixel value groups that are sequentially arranged in the direction of rows are stored at addresses in the image buffer that are separated by a distance corresponding to the number of dot formation elements in the print head, while the pixel values or the pixel value groups that are sequentially arranged in the direction of rows are stored at continuous addresses in the image buffer.

Further, to achieve the above objects, a serial printer according to the present invention changes the arrangement of data for each dot formation element array, so that when data are to be stored in the image buffer, the data can be sequentially transferred to the dot formation element arrays that are located at a distance from each other. Specifically, currently, the data are stored for each dot formation element array, and the number of sets of data that are provided is equivalent to the number of the dot formation element arrays. A data group to be transferred to a specific dot formation element array is sequentially stored at a specific timing when a data group is to be transferred at the same timing to another dot formation element array, so that the data are formed as a set for transfer at a specific print timing to the dot formation element array, and continuity of data can be established during the data transfer.

That is, according to the present invention, provided is a serial printer, which has a print head consisting of a plurality of dot formation element arrays that are located in the main scanning direction at a predetermined distance from each other, which performs an imaging process for producing image data and storing the image data in an image buffer and a transfer process for transferring the image data from the image buffer to the plurality of dot formation element arrays, and which displaces the print head in the main scanning direction and initiates printing at a predetermined print timing, wherein pixel values or pixel value groups of the image data, which are set at the same print timing for each of the dot formation element arrays, are stored at continuous addresses in the image buffer.

As a result, it is possible to handle a set of data that can be transferred to the dot formation element array at a print timing, so that continuity of data can be established during the data transfer.

As the number of address calculations and the number of memory accesses are accordingly reduced, regardless of whether a DMA data transfer (hardware transfer) or a program for an interrupt process (software transfer) is performed, the load imposed on the CPU during the data transfer can be reduced and the throughput can be improved.

In the invention according to the present invention, dummy data are stored at the predetermined interval in the image buffer, so as to access a set of pixel values or pixel value groups for the image data, which are set at the same print timing for the plurality of dot formation element arrays.

Therefore, not only is the data transfer processing facilitated, but data transfer programming is also easy.

BRIEF DESCRIPTION OF THE DRAWINGS

FIG. 13 is a diagram for explaining a method for transferring data from the image buffer of the conventional serial printer to the print head.

DETAILED DESCRIPTION OF THE PREFERRED EMBODIMENTS

First Embodiment

Figure 1:
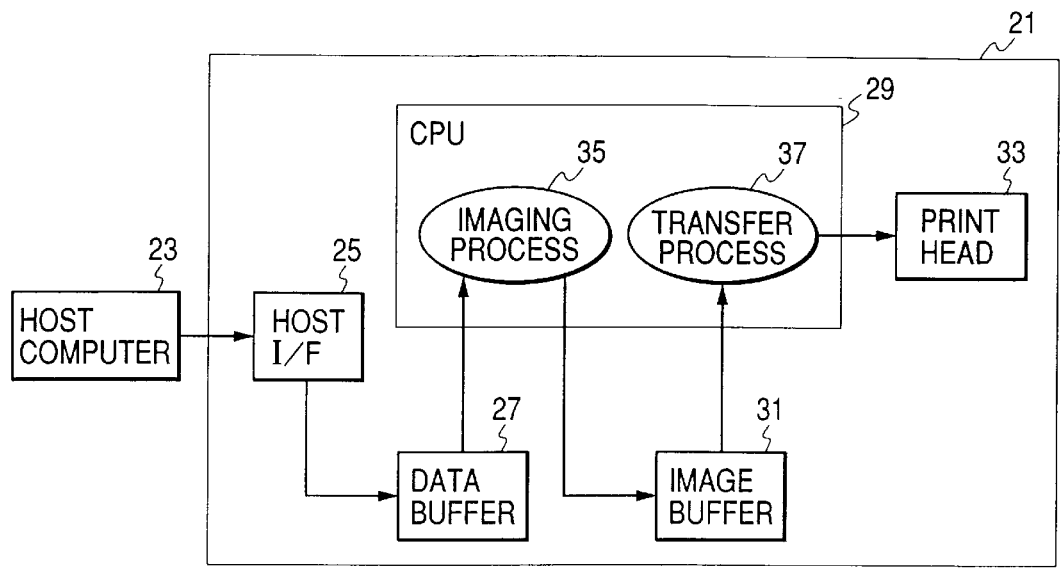
FIG. 1 is a functional block diagram illustrating the arrangement of a serial printer according to a first embodiment of the present invention.

In FIG. 1 is shown the general arrangement of a serial printer, according to a first embodiment of the present invention, that is employed as a terminal printer for a computer system.

A printer 21 receives source data from a host computer 23 via a host interface 25, and temporarily stores them in a data (reception) buffer 27. The source data constitutes a stream of commands that are represented in a language that the printer 21 understands, and the commands include data that represent an image using one of the above described forms.

A CPU 29 in the printer 21 performs an imaging process 35, a transfer process 37, and various other processes. In the imaging process 35, the source data are read from the data buffer 27 in the reception order and are translated, and raster graphics image data, which is a set of binary values indicating whether a dot should be printed for each pixel, are produced and written to an image buffer 31. In the transfer process 37, the image data in the image buffer 31 are transferred to a print head 33. The transfer process is performed as an interrupt process in which a periodical signal, which is transmitted by a carriage moving system (not shown) that moves the print head 33, is employed as a trigger.

Figure 2:
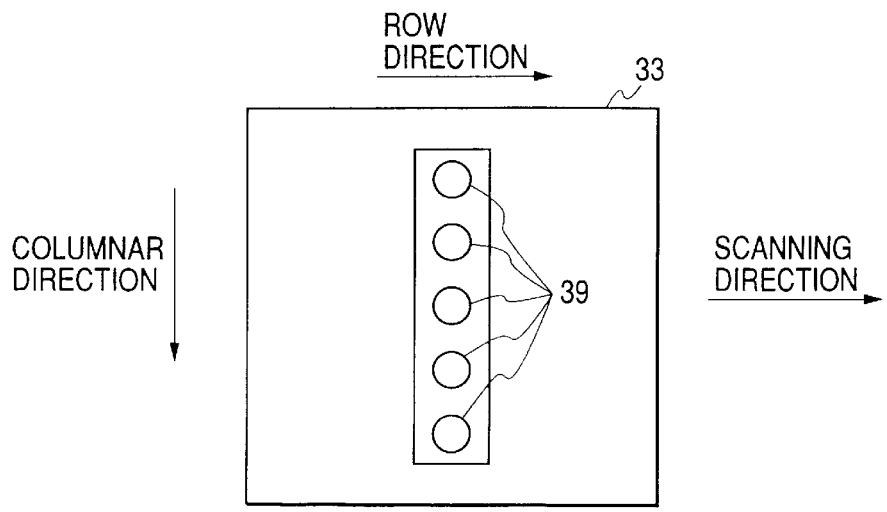
FIG. 2 is a schematic diagram showing the structure of a print head for the serial printer according to the first embodiment of the present invention.

FIG. 2 is a diagram showing the arrangement of dot formation elements in the print head 33 used in this embodiment.

The print head 33 has five dot formation elements 39 arranged in the columnar direction. The print head 33 moves in the direction of rows (horizontally) along the surface of a sheet, and the five dot formation elements 39 are operated at one time when they arrive at individual pixel locations (i.e., a dot is printed or not).

An actual print head has more dot formation elements than those shown in FIG. 2, for example, 32 dot formation elements, and in addition to the simple one array arrangement, a variety of arrangements, such as a zigzag arrangement, can be employed. Since the principle for those arrangements is the same, it would be easily understood by one having ordinary skill in the art that the principle of the present invention can be employed for a print head having a different arrangement, as well as the one in this embodiment.

Figure 3:
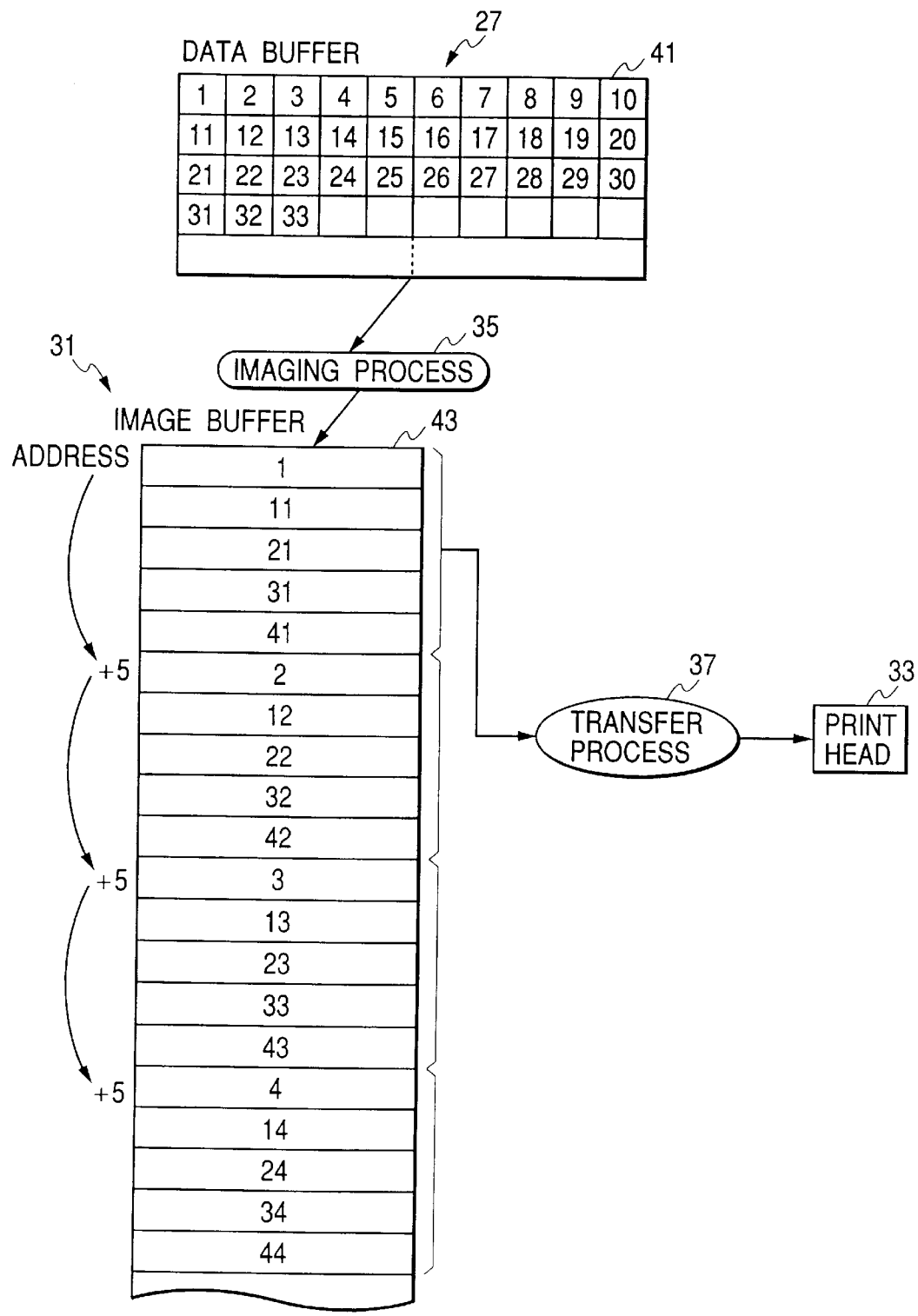
FIG. 3 is a diagram for explaining a method for storing data in an image buffer according to the first embodiment of the present invention.

In FIG. 3 is shown the writing and reading of data relative to the image buffer 31 according to this embodiment.

Figure 10:
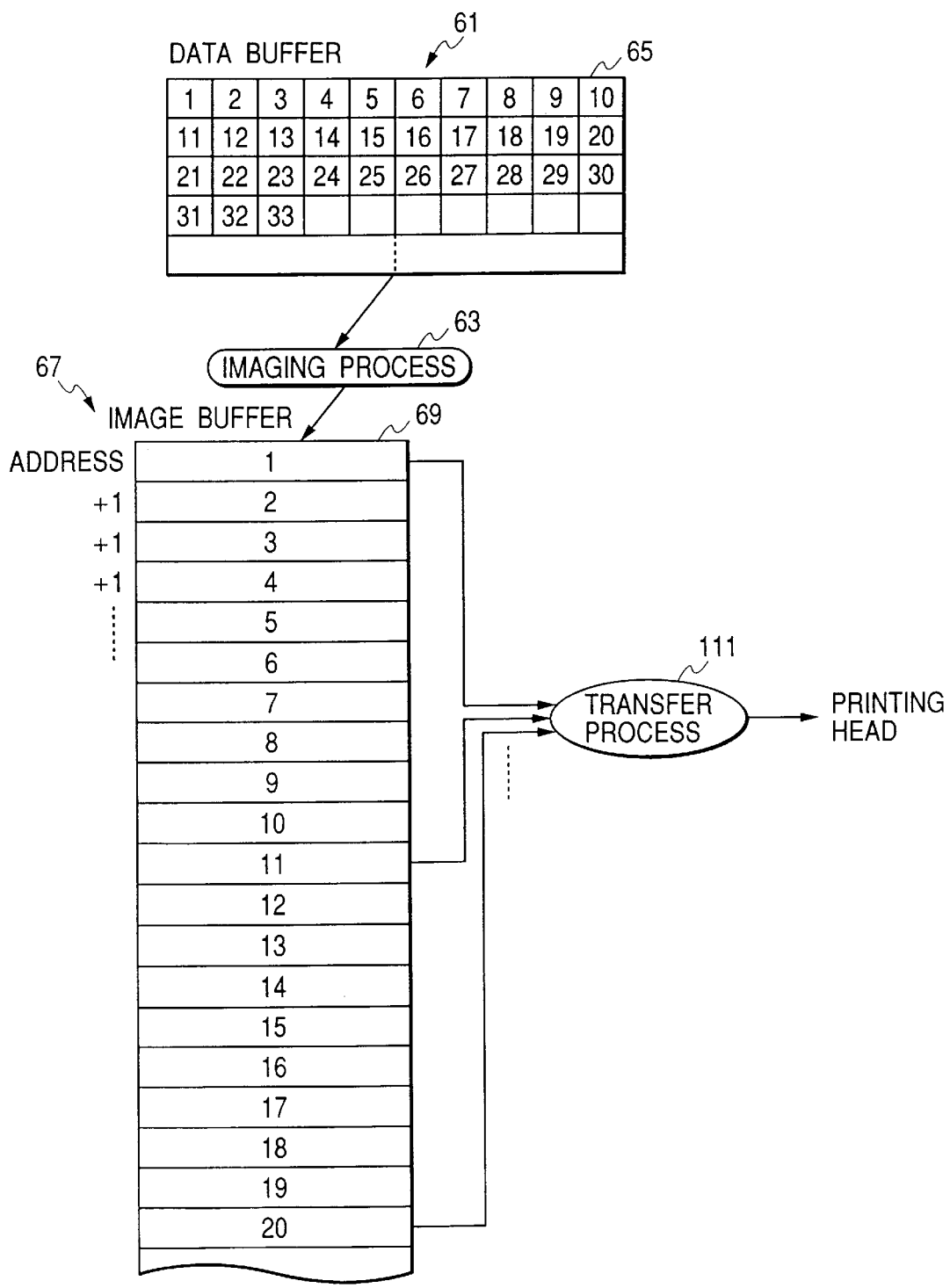
FIG. 10 is a diagram for explaining a method employed by a conventional serial printer for storing data in the image buffer.
Figure 11A:
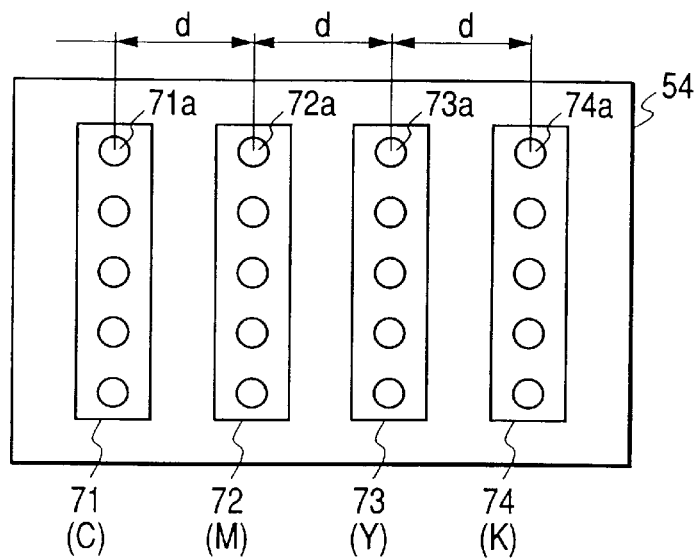
FIG. 11 is a diagram for explaining the blending of colors performed by a conventional serial printer; (a) being a schematic diagram for the arrangement of a print head, and (b) being a diagram showing the relationship between predetermined distance d and the color mixing.
Figure 11B:
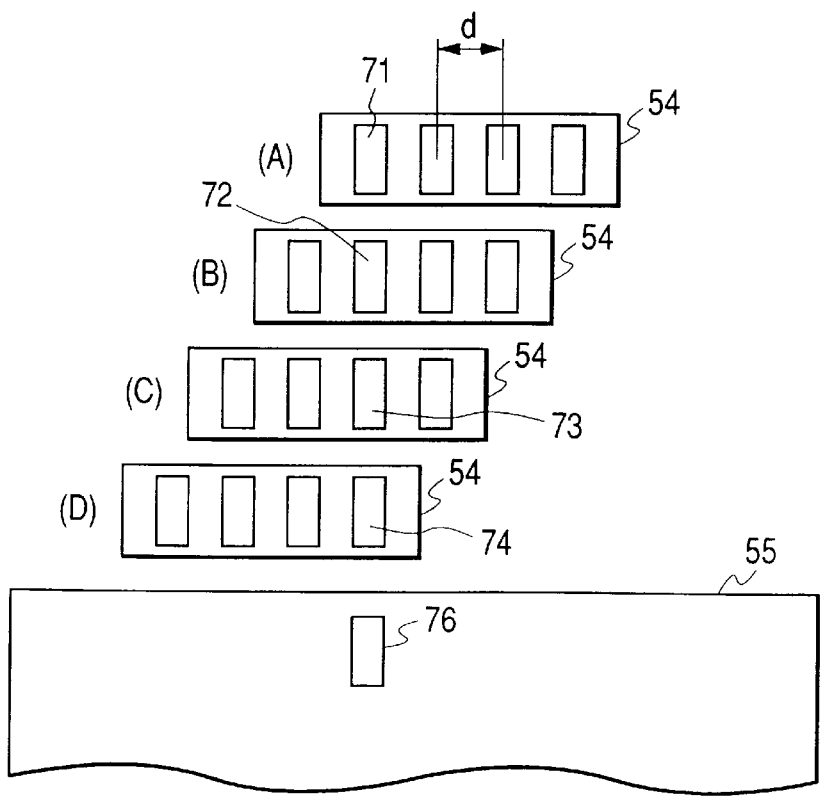

Source data 41 are stored in a data buffer 27. The source data 41 include various forms of data that represent images; in this example, as well as in FIG. 10, the image data included in the source data 41 are raster graphics data, so as to easily understand the meaning of the last image data in the image buffer 31, which will be described later. Blocks numbered 1, 2, 3, . . . in the source data 41 are byte data (sets of eight continuous pixel values on the same line), and the byte number represents the raster scanning order.

In the imaging process 35, the source data 41 are read from the data buffer 27 and are translated, and last raster graphics image data 43 are produced and written to the image buffer 31. At this time, in the imaging process 35, the bytes for the last image data 43 are produced in the raster scanning order (i.e., in the order of the byte numbers).

When, in the imaging process 35, the bytes that are generated in the raster scanning order are to be written to the image buffer 31, unlike in the conventional case, the image buffer 31 is not accessed in the order of addresses, but an address is accessed that is obtained by adding the number of dot formation elements 39 (hereinafter referred to as the "height" of the print head 33), which are arranged in the columnar direction in the print head 33, to the address at which the bytes for the immediately preceding line are written.

For example, the first byte is written at the first address as is shown in FIG. 3, the second byte is written at an address obtained by adding a head height of "5" to the first address, and the third byte is written at an address obtained by adding another "5" to the preceding address. In this manner, a plurality of bytes continuously arranged in the same line are stored at addresses in the image buffer 31 that are separated by a distance that is equivalent to the head height. When the bytes for one line have been stored, bytes for the following line are stored at addresses following the addresses of the bytes for the preceding line.

When, for example, bytes 1 to 10 for the first line have been stored, bytes 11 to 20 for the second line are stored at addresses following those for the bytes 1 to 10, and bytes for the third line are stored at addresseses following those for the second line bytes. When the storage of bytes up to the fifth line is completed, the image buffer 31 is as is shown in FIG. 3, and all the continuous addresses are occupied by data. Thereafter, bytes for the sixth and following lines are stored in the same manner in succeeding empty areas (not shown) in the image buffer 31.

Figure 4:
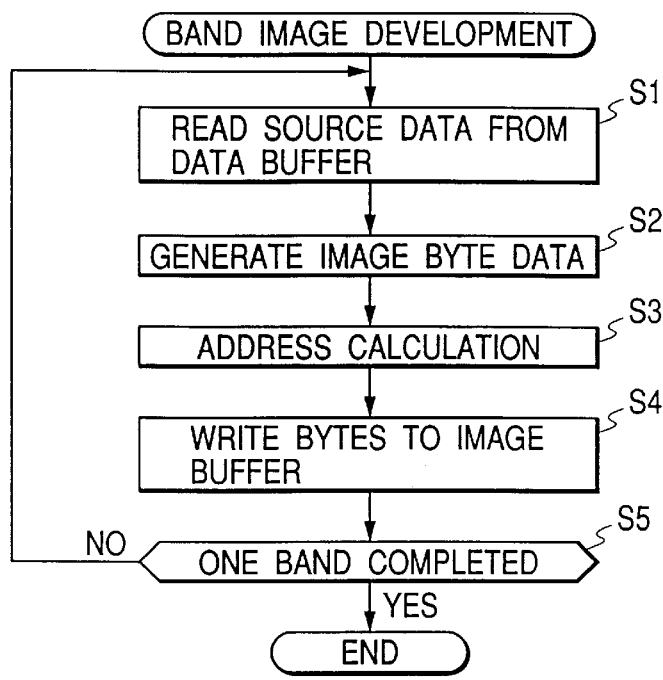
FIG. 4 is a flowchart for explaining the method used for storing data in the image buffer according to the first embodiment of the present invention.

FIG. 4 is a flowchart showing the storage processing. In the imaging process 35, processes are performed (steps S1 and S2) for generating bytes from the source data in the raster scanning order, and a process (step S3) for calculating addresses at which to store the obtained bytes. The bytes are then written at the obtained addresses (step S4). The above described processing is repeated for all the bands in a page image (step S5).

As a result of such image data storage processing, at the continuous addresses in the image buffer 31 are stored five bytes that are arranged in the columnar direction of an image and that correspond to the head height, as is shown in FIG. 3. For example, a set of five bytes, 1, 11, 21, 31 and 41, are stored at the first sequential addresses; a set of following five bytes, 2, 12, 22, 32 and 42, which are arranged adjacent to the five bytes in the direction of rows, are stored at the next sequential addresses; and a set of following five bytes, 3, 13, 23, 33 and 43, are stored at the succeeding sequential addresses. In short, the bytes are so arranged that the print head 33 in FIG. 2 forms dots that are stored at the sequential addresses in the image buffer 31.

In the transfer process 37, the image data 43 are read from the image buffer 31 and are transmitted to the print head 33. At this time, the data in the image buffer 31 are accessed in their addressed order. In other words, while the address is simply incremented by one, the bytes are read in order from the sequential addresses.

Therefore, the conventionally required complicated address calculations are not performed. Since the arrangement of the bytes in the image buffer 31 corresponds to the arrangement of the dot formation elements, a set of five bytes (e.g, bytes 1, 11, 21, 31 and 41) read from the sequential addresses can be transmitted at one time to the print head 33.

As is described above, the complicated address calculations are not required for the transfer process 37, and thus, the time required for the transfer processing is reduced compared to that required in the conventional case.

Figure 5:
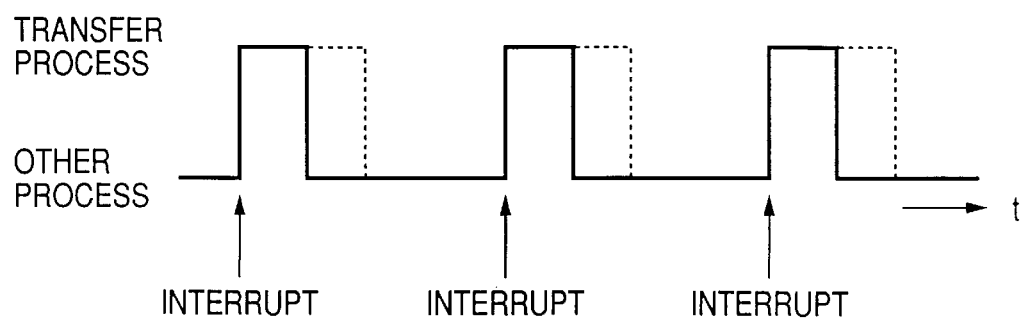
FIG. 5 is a timing chart showing the execution timings for a transfer process and a process including the other main process.

FIG. 5 is a time chart showing the execution timings for the transfer processing and the processing including the imaging processing. Compared with the conventional transfer process time indicated by the broken line, the transfer processing time in this embodiment is shorter by the time required for the address calculation, as is indicated by the solid line. Accordingly, an extended time is provided for the CPU 29 for allocation for a process other than the transfer process. Since in the imaging process address calculations are increased, which is not required for the conventional art, the imaging processing time is accordingly increased.

This time, however, as the processing load imposed on the CPU 29, is smaller than the load imposed when the address calculations are performed in the transfer process in the conventional art. This is because the transfer process must be performed at a precise timing in synchronization with a periodical interrupt signal from the carriage moving system, while, for the imaging process, there is no such restriction concerning the time, and free scheduling is to a degree permitted.

The scheduling is performed by a process schedular (not shown), one of the processing units in the CPU. As a result, in this embodiment, the load imposed on the CPU is smaller than the load imposed in the conventional art, and the throughput is improved.

It is preferable that scheduling be performed so that the performance of the imaging process can be set to occur during a period other than a period in which the transfer process is performed.

Second Embodiment

An explanation will now be given for a serial printer according to a second embodiment of the present invention, and an image buffer access method therefor.

A serial printer according to the second embodiment is a color ink-jet printer wherein, as well as in the above described conventional color ink-jet printer, a print head includes a plurality of ink-jet nozzle arrays, which are located at distance from each other and form dots at the same location at a predetermined print timing, using cyan, magenta, yellow and black ink droplets. The printer in the second embodiment is also used as a terminal printer for a computer system, and since the general arrangement is the same as that for the first embodiment in FIG. 1, no further explanation for it will be given.

Figure 6A:
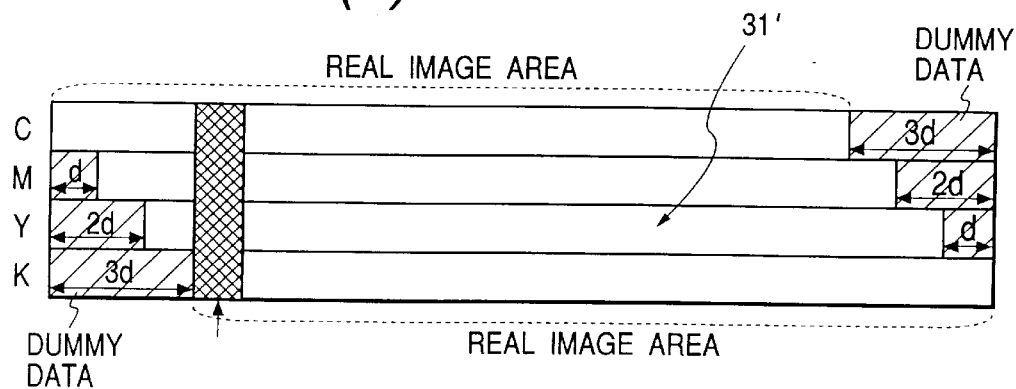
FIG. 6 is a diagram for explaining a method for storing data in the image buffer according to a second embodiment of the present invention; (a) being a conceptual diagram and (b) being a diagram showing the state wherein CMYK data are stored at sequential addresses.
Figure 6B:
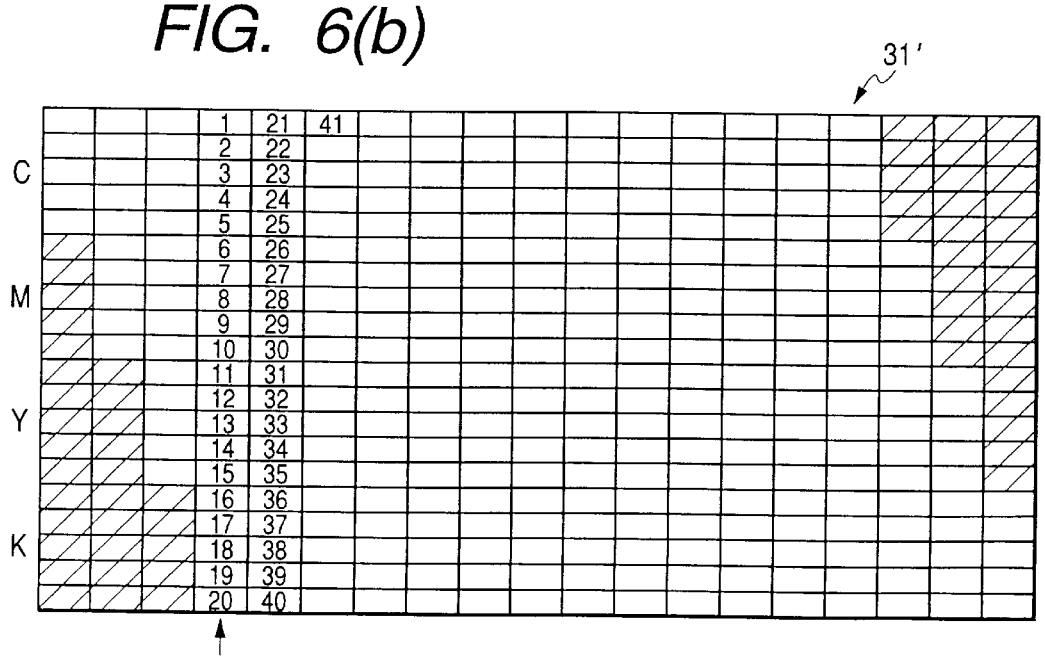

In FIG. 6 is shown a method employed by the serial printer in this embodiment for storing data in an image buffer.

As is shown in FIGS. 6(*a*) and 6(*b*), in the previously described imaging process 35 performed by the serial color printer, data for C, M, Y and K color nozzle arrays are stored in the same memory area in an image buffer 31'. The data groups, which are to be respectively transmitted to the C, M, Y and K color nozzle arrays at a specific print timing, are stored at continuous addresses in the image buffer 31', as is shown by the shaded portion in FIG. 6(*a*). In other words, when a data group that is to be transferred to the C nozzle array at the same timing is stored, also stored are data groups to be transmitted to the M, Y and K color nozzle arrays at the same timing.

In the previously described transfer process 37, as is shown in FIG. 6(*b*), a plurality of bytes (five bytes each for C, M, Y and K in the example, i.e., a total of 20 bytes), for the C, M, Y and K color nozzle arrays, which are at continuous addresses 1 to 20, are read as a data set from the image buffer 31', and at the same time are transmitted to the print head 33.

As described above, the main feature of the serial printer of the second embodiment, which has a plurality of nozzle arrays, is that a set of data is used that is to be transferred to individual nozzle arrays at a specific print timing, and continuity of data during the data transfer is provided.

Figure 12A:
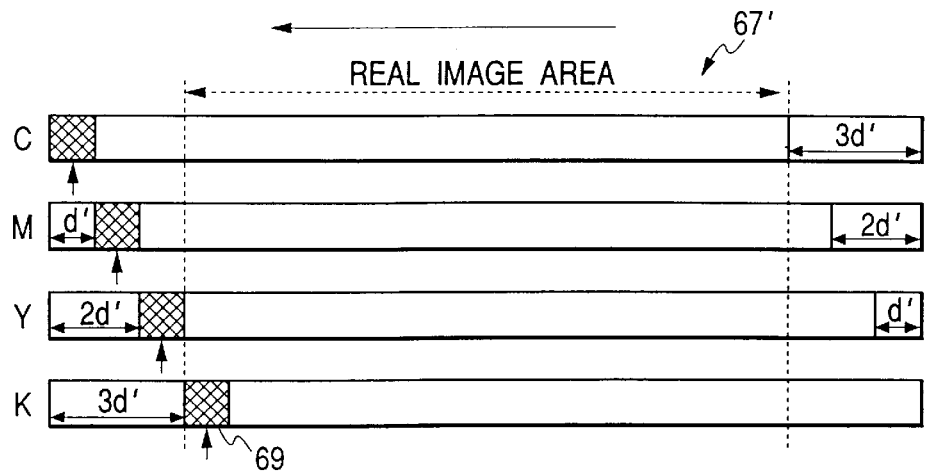
FIG. 12 is a diagram for explaining a method employed by a conventional serial printer for storing data in the image buffer; (a) being a conceptual diagram and (b) being a diagram showing the state wherein CMYK data are independently stored.

Portions d, 2d and 3d in FIG. 6(*a*) are memory portions that are defined the same as is explained in FIG. 12(*a*). As is shown in FIG. 6(*b*), real data are not stored in such dummy memory portions (binary "0" are stored), and there are defined as null buffers. Although the continuity of data can be obtained even without using the null buffer method, the following benefits can be obtained by using the null buffer method.

Specifically, the serial printer in this embodiment, which has a plurality of nozzle arrays, employs a set of data to be transferred to individual nozzle arrays at a specific print timing, and provides continuity of data during the data transfer. As is shown in FIG. 6(*a*), since the dummy data are stored at the end portion of the image buffer, a set of data can be transferred at a specific timing from any area in the image buffer to the individual nozzle arrays, regardless of whether the data are dummy data.

When the null buffer method is employed, from the programming viewpoint, extra branching is not required and the processing according to the program can be performed more easily.

In the second embodiment, to store data (including dummy data) in the image buffer even when the printing direction is changed, CMYK real data and dummy data need only be stored at the sequential addresses in the image buffer in the order shown in FIG. 6(*b*). However, when the image buffer in which data (including dummy data) are stored in the same order is employed for bidirectional printing, the direction in which data (including dummy data) are to be extracted from the image buffer must be reversed in accordance with the printing direction.

The direction for accessing the image buffer need only be reversed for the DMA transfer or for a data transfer performed by an interrupt process; however, a head data register for a print head, i.e., in a print ASIC, should be designed for the transmission of data to a corresponding nozzle array in either direction.

When, in a head data register in the print ASIC, an address to be transferred differs for each nozzle array, the storage of data does not depend on the transfer order. When a transfer destination address is used in common by the CMYK nozzle array, and when the data (including dummy data) are extracted from the image buffer in the reverse direction, the storage of data in the head data register is also performed in the reverse direction. In this case, a select switch must be provided for the print ASIC, so that the direction in which data are to be stored in the head data register is changed before the transfer of data is initiated.

A specific explanation will now be given for a method for storing data in the image buffer in this embodiment, and a method for transferring data from the image buffer to the print head.

According to one of the storage methods, first, pixel values or a pixel value group for C image data are stored at the sequential addresses in the image buffer 31', the number of which is equivalent to the number of ink-jet nozzles that are arranged in the columnar direction for a C nozzle array of the print head. Then, pixel values or pixel value groups for C image data, which are sequentially generated and which correspond to the number of C ink-jet nozzles, are stored at the addresses in the image buffer 31' that are separated by a distance that corresponds to the number of ink-jet nozzles for the image buffer 31' x (the number of nozzle arrays–1).

Specifically, first, for the first pixel value group for C image data, byte data 1 to 5 are stored at five sequential addresses, 1 to 5, in the image buffer 31' that correspond to the number of C ink-jet nozzles. Then, data for a pixel value group for the next C image data, i.e., byte data 6 to 10, which are sequentially generated, are stored at five addresses, 21 to 25, in the image buffer 31' that correspond to the number of C ink-jet nozzles and that are separated by a distance corresponding to 15 bits, which is 5 (ink-jet nozzle count)×[4 (total CMYK nozzle array count)–1]. The storage of data is repeated in the same manner for data Ca, Cb, Cc and Cd (not shown), each of which is five bytes long.

Pixel values or a pixel value group for image data for M ink-jet nozzle arrays, which follows array C, i.e, byte data 101 to 105, are stored at five addresses, 6 to 10, in the image buffer 31' that follows the addresses, 1 to 5, at which Ca are stored and that correspond in number to the M ink-jet nozzles. Then, a pixel value group for the next M image data, i.e., byte data 106 to 110 that are sequentially generated, are stored at five addresses, 26 to 30, in the image buffer 31' that correspond in number to the M ink-jet nozzles and that are separated by a distance corresponding to 15 bits, which is 5 (ink-jet nozzle count)×[4 (total CMYK nozzle array count)–1]. The storage of data is repeated in the same manner for data Ma, Mb, Mc and Md (not shown), each of which is five bytes.

Pixel values or a pixel value group for Y and K image data are stored in the same manner as for C and M, and this process is repeated for data Ya, Yb, Yc and Yd (not shown) and Ka, Kb, Kc and Kd (not shown), each of which is five bytes.

In the transfer process 37 for transferring data from the image buffer 31' to the print head 33, first, data Ca, Ma, Ya and Ka, each of which is five bytes, a total of 20 bytes, are transmitted to the print head 33 simultaneously in accordance with the first printing timing. Then, data Cb, Mb, Yb and Kb, each of which is five bytes, a total of 20 bytes, are transmitted to the print head 33 simultaneously in accordance with the second printing timing. This transfer process is repeated in accordance with the third, the fourth, . . . printing timing, and each time C, M, Y and K data, each of which is five bytes, a total of 20 bytes, are transmitted simultaneously.

Figure 7:
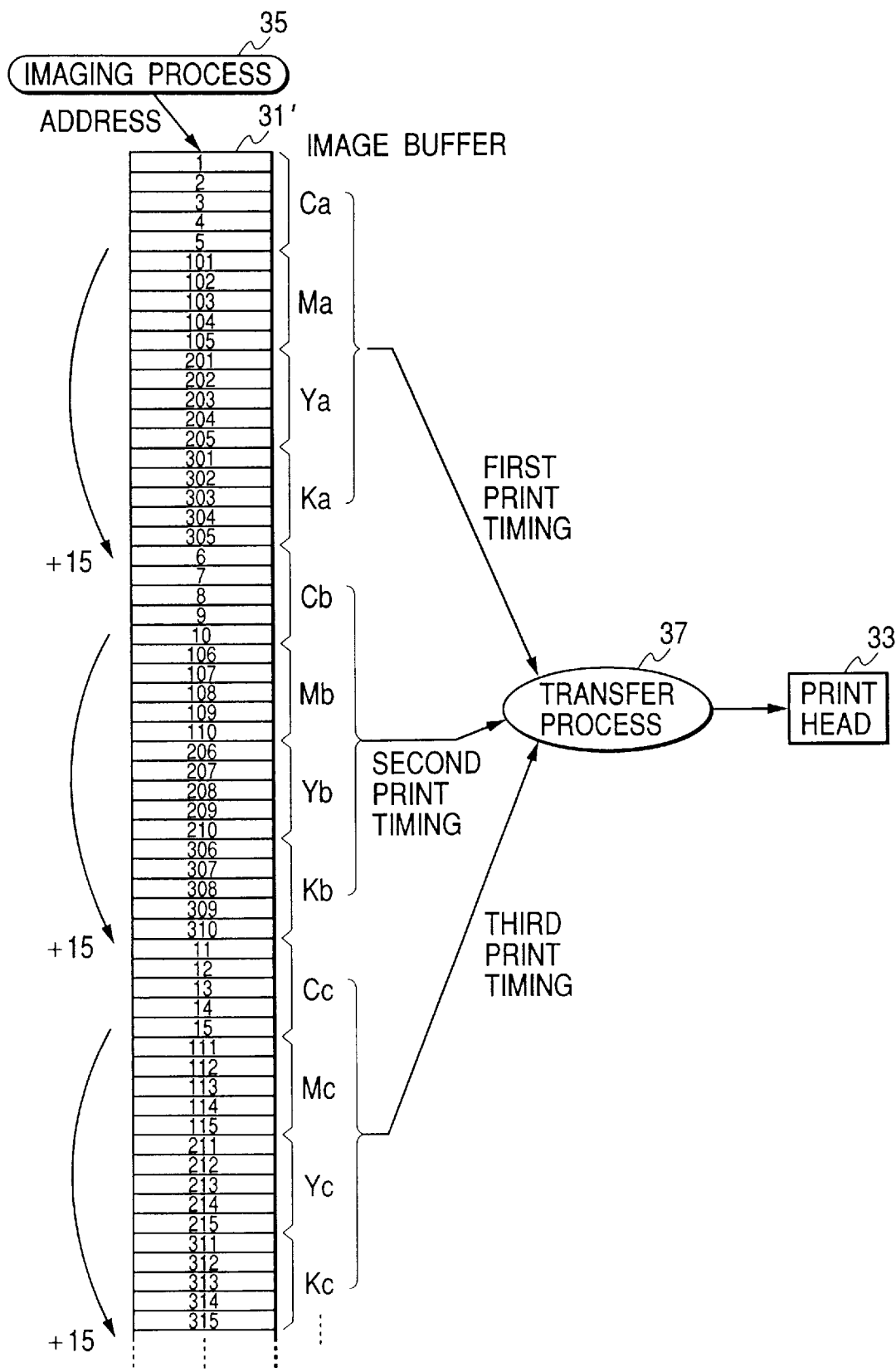
FIG. 7 is a diagram for explaining both a method for storing data in an image buffer and a method for transferring data from the image buffer to a print head according to the second embodiment of the present invention.
Figure 12B:
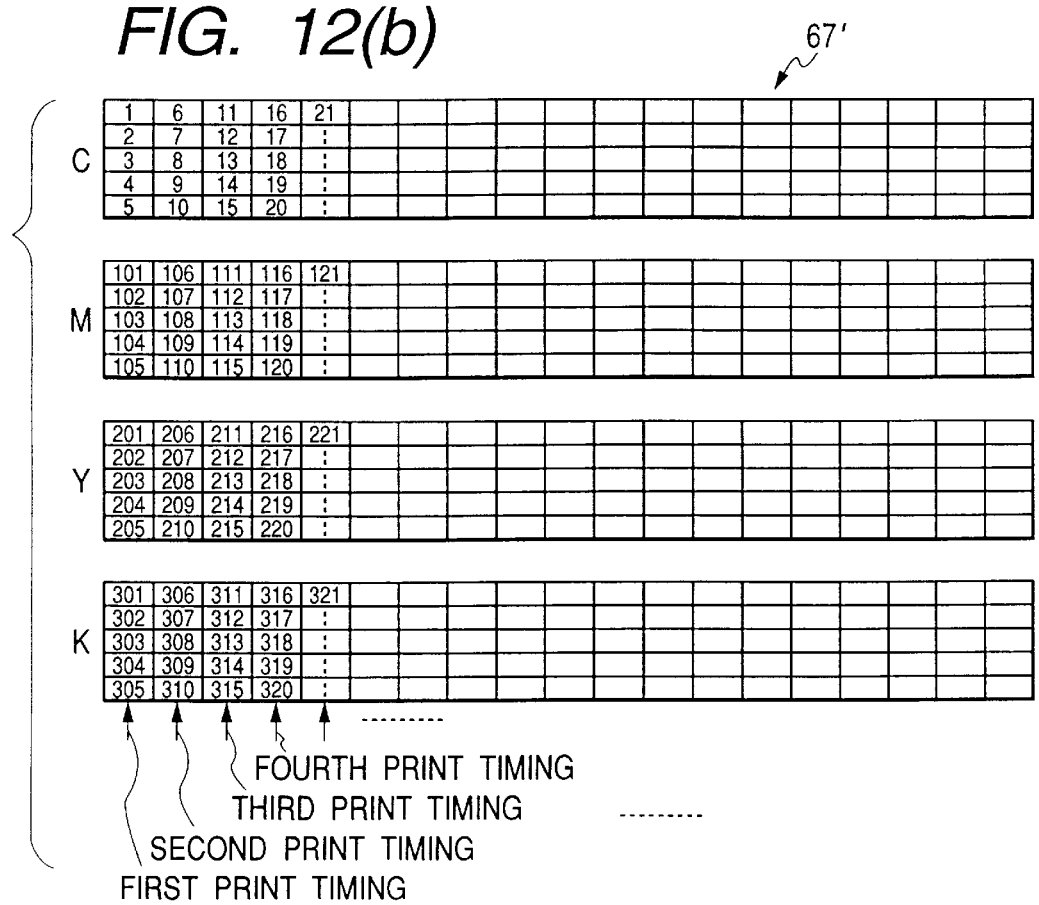

As is apparent from FIG. 7, in order to more easily understand the present invention by performing a comparison with FIG. 12(b), in the second embodiment, unlike in the first embodiment, it is not assumed that pixel values or pixel value groups of image data are generated in the raster scanning order in the imaging process. If the CMYK image data are generated in the raster scanning order, the values representing the byte data in the image buffer 31' in FIG. 7 are changed; for example, byte data 1 to 5, which form a first pixel value group for Ca, are rewritten to values 1, 11, 21, 31 and 41, as is explained in the first embodiment while referring to FIG. 3.

Figure 8:
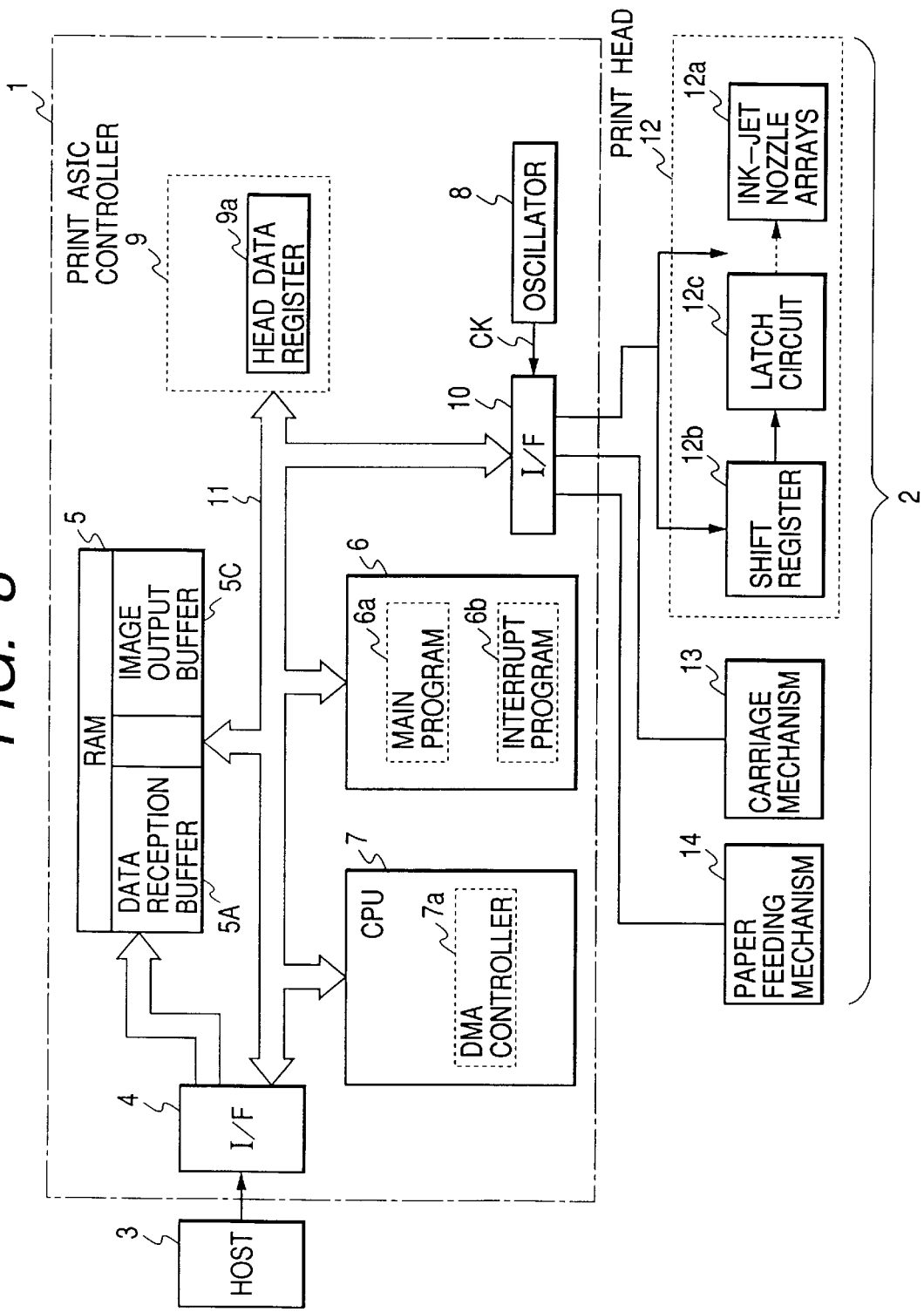
FIG. 8 is a diagram showing an example, using the second embodiment of the present invention, wherein, during a transfer process, a transfer of image data to the print head is performed by a program and a DMA transfer is performed.

In FIG. 8 is shown an example for the second embodiment wherein in the transfer process 37 the image data are transferred to the print head 33 by using a program, and DMA is employed for their transfer to the print head 33.

The serial printer in FIG. 8 comprises a printer controller 1 and a print engine 2. The printer controller 1 comprises an interface (hereinafter referred to as an "I/F") 4, for receiving print data from a host computer 3; a RAM 5, in which various data are stored; a ROM 6, in which routines for various data processes are stored; a CPU 7; an oscillator 8; a print ASIC controller 9, for transmitting head data to a print head 11 that will be described later; and an I/F 10, for transmitting to the print engine 2 print data that are developed into dot pattern data (bitmapped data) and drive signals. The I/F 4, the RAM 5, the ROM 6, the CU 7, the print ASIC controller 9 and the I/F 10 are interconnected by a bus 11.

The I/F 4 receives from the host computer 3 print data consisting of, for example, image data. The RAM 5 is used as a data reception buffer 5A, an image output buffer 5C and a work memory (not shown). In the data buffer 5A are temporarily stored print data consisting of image data that are received by the I/F 4 from the host computer 3. In the image buffer 5C are developed dot pattern data that are obtained by decoding tone data. In the ROM 6 are stored various control programs to be executed by the CPU 7.

These programs are a main program 6a and an interrupt process program 6b, as is shown in FIG. 8. In the ROM 6 are also stored font data (not shown), a graphics function and various other processes. The print ASIC controller 9 controls a head driver, and includes a register (head date register) 9a for transmitting the print data to a print head 12.

First, the CPU 7 performs the imaging process 35 described in the first and the second embodiments in accordance with the main program 6a stored in the ROM 6. That is, the CPU 7 reads the print data from the data buffer 5A and stores them in the work memory in the RAM 5.

Following this, the CPU 7 analyzes the data read from the work memory, and refers to the dot data and the graphic function in the ROM 6 to develop the data into dot pattern data. A required accessory process is performed for the obtained dot pattern data, and the resultant data are stored in the image buffer 5C. Further, the CPU 7 performs the imaging process 35 and the transfer process 37 at the same time. In other words, when an interrupt occurs at a predetermined print timing (print trigger), the CPU 7 halts the execution of the main program 6a and initiates the interrupt program 6b.

At the print timing (print trigger) and in accordance with the software interrupt program 6b, as is described above, a set of data comprising of a plurality of bytes for C, M, Y and K color nozzles, which are used for sequential addresses, are read from the image buffer 5C, and at the same time, are transferred to the head data register 9a. The data are temporarily stored in the head data register 9a, and are then transmitted in series via the I/F 10 to the print head 12.

The print engine 2 comprises the print head 12, a carriage mechanism 13 and a paper feeding mechanism 14. The paper feeding mechanism 14, which includes a paper feeding motor and a paper feeding roller, sequentially transfers a recording medium, such as a recording sheet, and performs sub-scanning. The carriage mechanism 13 includes a carriage on which the print head 12 is mounted, and a carriage motor for driving the carriage along a timing belt, and performs the main displacement of the print head 12. The print head 12, which has four ink-jet nozzle arrays 12a for C, M, Y and K colors, each array including, for example, 32 multiple nozzles, ejects ink droplets from the nozzles in consonance with a predetermined timing.

As is described above, data, which are temporarily stored in the head data register 9a, are transmitted in series, in synchronization with a clock signal (CK) from the oscillator 8, via the I/F 10 to a shift register 12b in the print head 12. The print data, which are transmitted in series, are latched by a latch circuit 12c and are boosted by a level shifter (not shown), and the resultant data are transmitted to a switching circuit to control its operation.

When print data "1" is transmitted to the switching circuit, a drive signal is applied to a piezoelectric vibrator connected to the switching circuit, and the piezoelectric vibrator is expanded or compressed in response to the drive signal. As a result, ink droplets are ejected through the pertinent nozzles of the ink-jet nozzle array 12a. When print data "0" is transmitted to the switching circuit, the supply of a drive signal to the piezoelectric vibrator is halted, and no ink droplets are ejected through the pertinent nozzles of the ink-jet nozzle array 12a.

Figure 9:
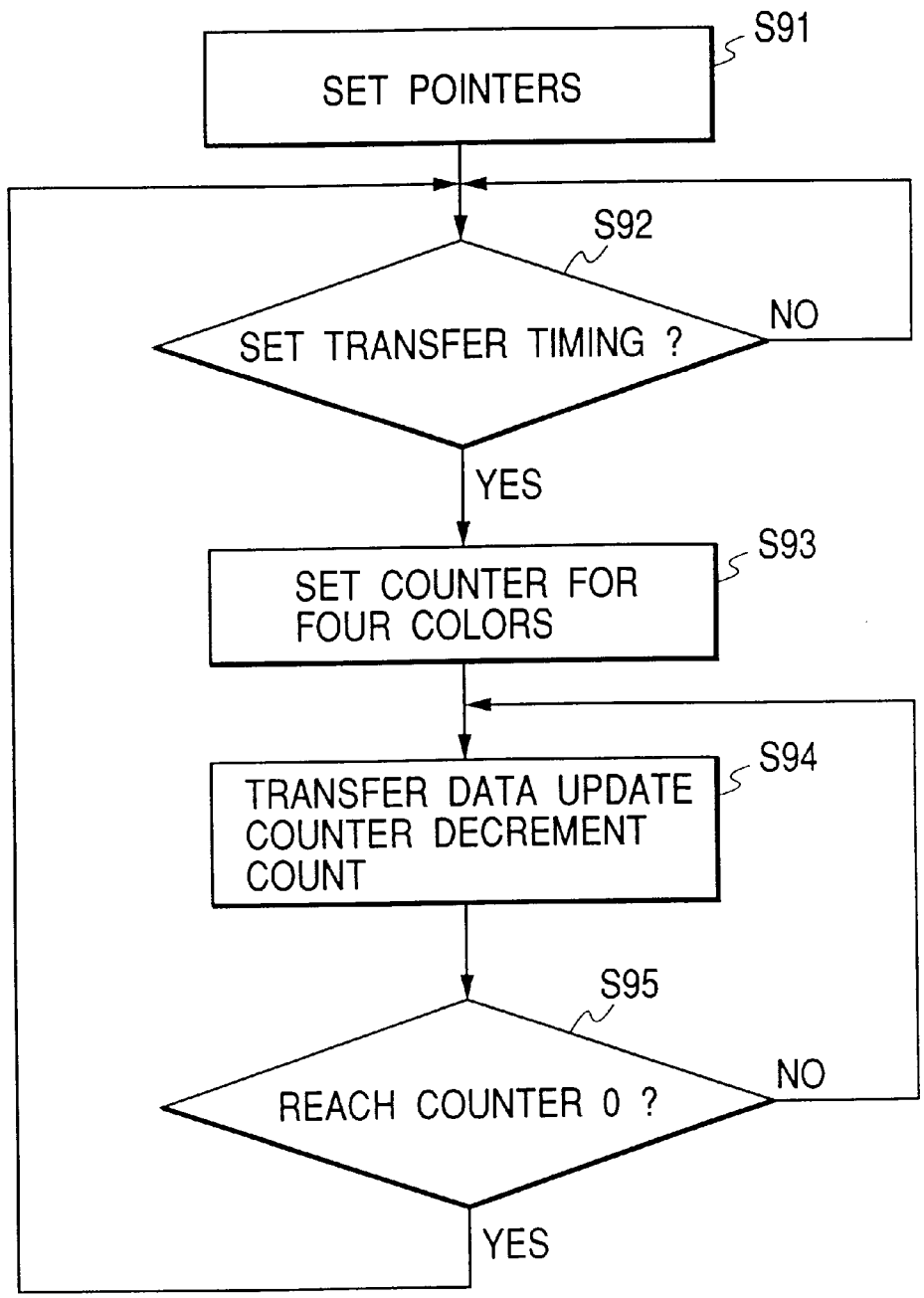
FIG. 9 is a flowchart showing an example, using the second embodiment of the present invention, wherein, during a transfer process, a transfer of image data to the print head is performed by a program.

FIG. 9 is a flowchart showing the processing performed by the serial printer in FIG. 8 for transferring data to the print head in accordance with the program (software).

Specifically, for a transfer of data using a program, pointers are set for four colors of C, M, Y and K (S91), and when a transfer timing (print trigger) is generated (S92), a value for four colors C, M, Y and K is set in a counter (S93). Following this, data for a plurality of bytes for the C, M, Y and K color nozzle arrays are transmitted to the print head 33, and during this transmission, the pointers are updated and the value held by the counter is decremented (S94). When the value held by the counter reaches 0 (S95), program control returns to S92 to wait for the next transfer timing.

As is described above, while the conventional art in FIG. 14 requires the independent management of pointers for the C, M, Y and K colors, in the serial printer in the embodiment, when the transfer of data for a specific color or a specific nozzle array at a specific timing is completed, the source pointer points to data (an address) for a color or a nozzle array to be transmitted next, so that the management of the pointer for each nozzle array or for each color, which is conventionally required, is very easy. In other words, since the number of required pointers and the number of times memory is accessed are reduced, the time required for the transfer process 37 can be reduced.

The transfer process 37 for a DMA transfer of image data to the print head 12 will now be described while referring to FIG. 8.

In the serial printer in FIG. 8, included in the CPU 7 is a DMA controller 7a that has two transfer circuits (channels).

The transfer of data begins with the activation of the DMA transfer function. When a signal (print trigger) is received at the CPU 7 in accordance with the above described print timing, the CPU 7 assigns the right of usage of the bus 11 to the DMA controller 7a. Then, as is described above, the DMA controller 7a transmits a set of image data for a plurality of bytes for the C, M, Y and K color nozzle arrays, which serve as sequential addresses, from the addresses in the image buffer 5C, in which the image data are stored, via the bus 11 to the head data register 9a, i.e., the DMA transfer is performed. Since the DMA transfer requires only an extremely short time, the CPU 7 can immediately initiate a subsequent process.

After the DMA transfer is completed, the DMA controller 7a transmits a trigger signal to the oscillator 8. the oscillator 8 employs an oscillator to generate a clock having a frequency that corresponds to the maximum speed of the shift register 12b of the print head 12. After the DMA transfer is completed, the oscillator 8 is activated upon receipt of the trigger signal, and outputs a clock having bits equivalent in count to the number of nozzles for each ink-jet nozzle array 12a. In synchronization with the clock, the head data are transmitted as serial data from the head data register 9a to the shift register 12b of the print head 12. The above processing is repeated for data for eight horizontally arranged bits (one byte).

As is described above, according to the second embodiment, since data to be transmitted to CMYK nozzle arrays at a specific print timing are stored in advance at sequential addresses in the image buffer 5C, the above described DMA transfer can be performed via the same transfer circuit (channel), and thus, if there is at least one transfer circuit channel the DMA transfer can be employed.

Therefore, a DMA controller, such as the DMA controller 7a, that is built into the CPU and has only a few transfer circuits (channels) can be used to perform a DMA transfer to a print head, and the process that is performed in accordance with the program can be performed at high speed for an extended period of time.

The embodiments of the present invention have been explained; however, the present invention is not limited to the embodiments that have been explained and can be applied for other embodiments that falls within the scope of the claims for the invention.

While a color printer having CMYK color nozzle arrays has been described in the second embodiment, the invention cited in claim 9 is not limited to the color printer, but can be used for a monochrome printer having a plurality of nozzle arrays that are separated from each other.

In the first embodiment, the raster graphics image data have been employed. That is, an example has been described where, in the imaging process, pixel values or pixel value groups for image data are generated in the raster scanning order, and are rearranged from in the raster scanning order into the order in which they are printed by the print head. However, the present invention is not limited to this example, and the second embodiment especially can be used for an example where data are transmitted as a bit-image command from the host computer.

Also, the present invention can be used not only for an ink-jet printer, but also for another serial printer having dot formation element arrays, such as a dot impact printer.

In the second embodiment, the DMA controller in the CPU performs the DMA transfer of head data. This embodiment may be used for a printer that includes a separate DMA controller not included as part of a CPU.

As is described above, according to the present invention, pixel values or a pixel value group for image data, which are set for a specific dot formation element array of a print head at the same print timing, are stored at sequential addresses in an image buffer. Therefore, since the continuity of image data can be obtained and a set of data can be transmitted, the number of address calculations and the number of memory accesses can be reduced, and as the load imposed on the CPU during the data transfer can also be reduced, the throughout can be improved.

In addition, since the storage of data at the sequential addresses is performed in the imaging process, the number of address calculations performed during the transfer process can be reduced, and as the time required for the process, which time is very limited, can also be reduced, the throughout can be increased.

What is claimed is:

1. A serial printer comprising:
a print head including at least one dot formation element array, which performs an imaging process for generating image data which storing said image data in an image buffer and a transfer process by which said image data are transferred from said image buffer and are set in said predetermined formation element array, and which displaces said print head in a main direction and initiates printing in accordance with a predetermined printing timing, wherein a pixel value or pixel value groups for image data, which are set at the same printing time for said predetermined dot formation element array, are stored at continuous addresses in said image buffer.

2. A serial printer according to claim 1, wherein, in said imaging process, pixel values or pixel value groups of image data, which are set for said predetermined dot formation element array at the same printing timing, are stored at continuous addresses in said image buffer.

3. A serial printer according to claim 1, wherein, in said imaging process, pixel values or pixel value groups for image data are generated in a raster scanning order, and are stored at addresses in said image buffer that are separated by a distance corresponding to the number of dot formation elements in the sub-scanning direction.

4. A serial printer according to claim 1, wherein, in said imaging process, pixel values or pixel value groups that are sequentially arranged in the direction of a row are stored at addresses in said image buffer separated by a distance equivalent to the count of said dot formation elements in a sub-scanning direction, and wherein pixel values or pixel value groups that are sequentially arranged in a columnar direction are stored at continuous addresses in said image buffer.

5. A serial printer according to one of claims 1, wherein, in said imaging process, said pixel values or said pixel value groups for one line that are sequentially generated are stored at addresses in said image buffer that are separated by a distance corresponding to the number of dot formation elements that are arranged in a sub-scanning direction; and wherein pixel values or pixel value groups that are sequentially generated for a subsequent line are stored at addresses following said addresses for said pixels and said pixel value group for a previous line.

6. A serial printer according to one of claims 1, wherein, in said transfer process, image data are read in order at said continuous addresses in said image buffer.

7. A serial printer according to one of claims 1, further comprising:
scheduling means for adjusting a schedule, in accordance with which said imaging process is performed, within a period other than a period during which said transfer process is performed.

8. An image buffer access method for a serial printer, which includes a print head having at least one dot formation element array, comprising the steps of:
an imaging process for generating image data and for storing said image data in an image buffer;
a transfer process for transferring said image data from said image buffer and for setting said image data in said predetermined formation element array; and
a printing process for performing the printing in accordance with a predetermined printing timing with said print head being moved in a main scanning direction,
wherein, in said imaging process, a pixel value or pixel value groups for image data, which are set at the same printing time for said predetermined dot formation element array, are stored in said image buffer, so that addresses for said pixel values or said pixel value groups in said image buffer are continuous.

9. A serial printer, which has a print head including a plurality of dot formation element arrays that are located in the main scanning direction at a predetermined distance from each other, comprising the steps of:
an imaging process for producing image data and for storing said image data in an image buffer,
a transfer process for transferring said image data from said image buffer to said plurality of dot formation element arrays;
a printing process for performing the printing in accordance with a predetermined printing timing with said print head being moved in a main scanning direction,
wherein pixel values or pixel value groups of said image data, which are set at the same print timing for each of said dot formation element arrays, are stored at continuous addresses in said image buffer.

10. A serial printer according to claim 9, wherein, in said imaging process, a pixel value or pixel value groups for image data, which are set at the same printing time for said predetermined dot formation element array, are stored at continuous addresses in said image buffer.

11. A serial printer according to claim 9, wherein dummy data are stored at said predetermined interval in said image buffer, so as to access a set of pixel values or pixel value groups for said image data, which are set at the same print timing for said plurality of dot formation element arrays.

12. A serial printer according to claim 11, wherein said dummy data are non-printed data.

13. A serial printer according to claim 9, wherein said dot formation element arrays are constituted by columnar groups, and wherein said columnar groups are used to print different colors.

14. A serial printer according to claim 9, wherein said dot formation element arrays are constituted by columnar groups, and wherein said columnar groups are used to print a single color.

15. A serial printer according to claim 9, wherein said pixel values or said pixel value group for said image data are transferred by software for performing an interrupt to said print head.

16. A serial printer according to claim 9, wherein is performed a DMA transfer, to said print head, of said pixel values or of said pixel value groups for said image data.

17. A serial printer according to claim 16, wherein said DMA transfer is performed by the same transfer circuit.

* * * * *